United States Patent
Sankaranarayanan et al.

(10) Patent No.: US 9,652,686 B2
(45) Date of Patent: May 16, 2017

(54) OPTIMIZED FAST FEATURE DETECTION FOR VECTOR PROCESSORS

(71) Applicant: TEXAS INSTRUMENTS INCORPORATED, Dallas, TX (US)

(72) Inventors: Jayasree Sankaranarayanan, Kerala (IN); Dipan Kumar Mandal, Bangalore (IN); Prashanth R Viswanath, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/345,523

(22) Filed: Nov. 8, 2016

(65) Prior Publication Data

US 2017/0076173 A1    Mar. 16, 2017

Related U.S. Application Data

(63) Continuation of application No. 14/581,401, filed on Dec. 23, 2014, now abandoned.

(30) Foreign Application Priority Data

Nov. 3, 2014 (IN) .......................... 5510/CHE/2014

(51) Int. Cl.
*G06K 9/46* (2006.01)
*G06K 9/48* (2006.01)
*G06K 9/62* (2006.01)
*G06K 9/00* (2006.01)

(52) U.S. Cl.
CPC ....... *G06K 9/4638* (2013.01); *G06K 9/00986* (2013.01); *G06K 9/481* (2013.01); *G06K 9/6211* (2013.01)

(58) Field of Classification Search
CPC .............. G06K 9/4604–9/4638; G06K 9/4671
See application file for complete search history.

(56) References Cited

U.S. PATENT DOCUMENTS

| | | | | |
|---|---|---|---|---|
| 2013/0089261 A1* | 4/2013 | Sung | ................. | G06K 9/4604 382/199 |
| 2014/0314323 A1* | 10/2014 | Zhang | ................. | G06K 9/00973 382/197 |
| 2014/0348431 A1* | 11/2014 | Brick | ................. | G06K 9/00986 382/195 |

* cited by examiner

*Primary Examiner* — Brian P Werner
(74) *Attorney, Agent, or Firm* — Robert D. Marshall, Jr.; Charles A. Brill; Frank D. Cimino

(57) ABSTRACT

This invention enables effective corner detection of pixels of an image using the FAST algorithm using a vector SIMD processor. This invention loads an 8×8 pixel block that includes four 7×7 pixel blocks including the 16 peripheral pixels to be tested for each of four center pixels. This invention rearranges the 64 pixels of the 8×8 block to form a 16 element array for each center pixel preferably using a vector permutation instruction. This invention uses vector SIMD subtraction and compare and vector SIMD addition and compare to make the FAST algorithm comparisons. The N consecutive pixels determinations of the FAST algorithm are made from the results of plural shift and AND operations. The corresponding center pixel is marked a corner or not a corner dependent upon of the results of plural shift and AND operations.

11 Claims, 16 Drawing Sheets

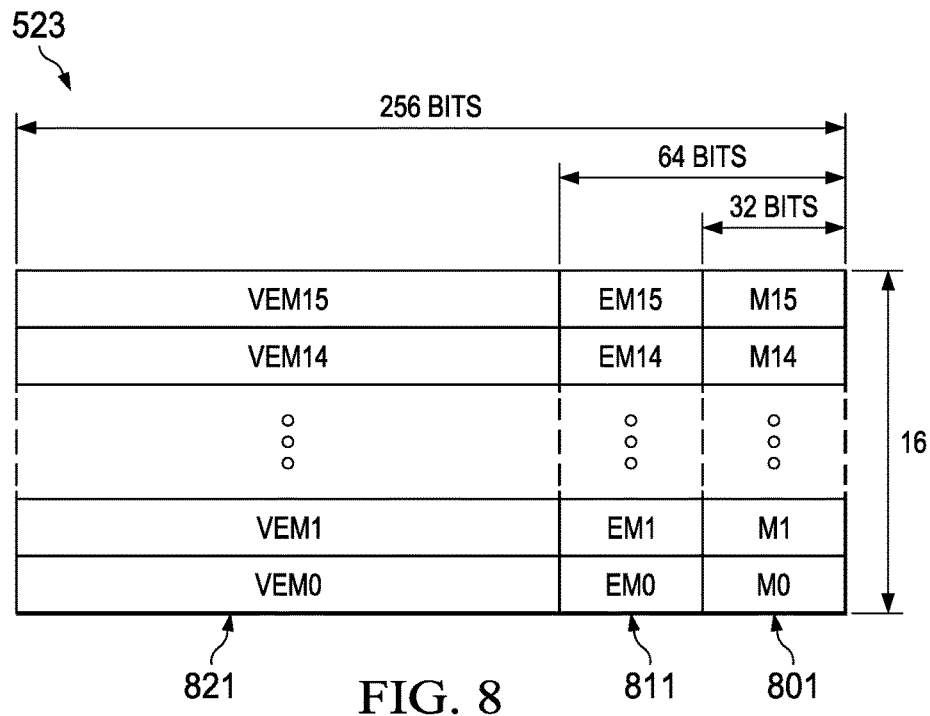
FIG. 8
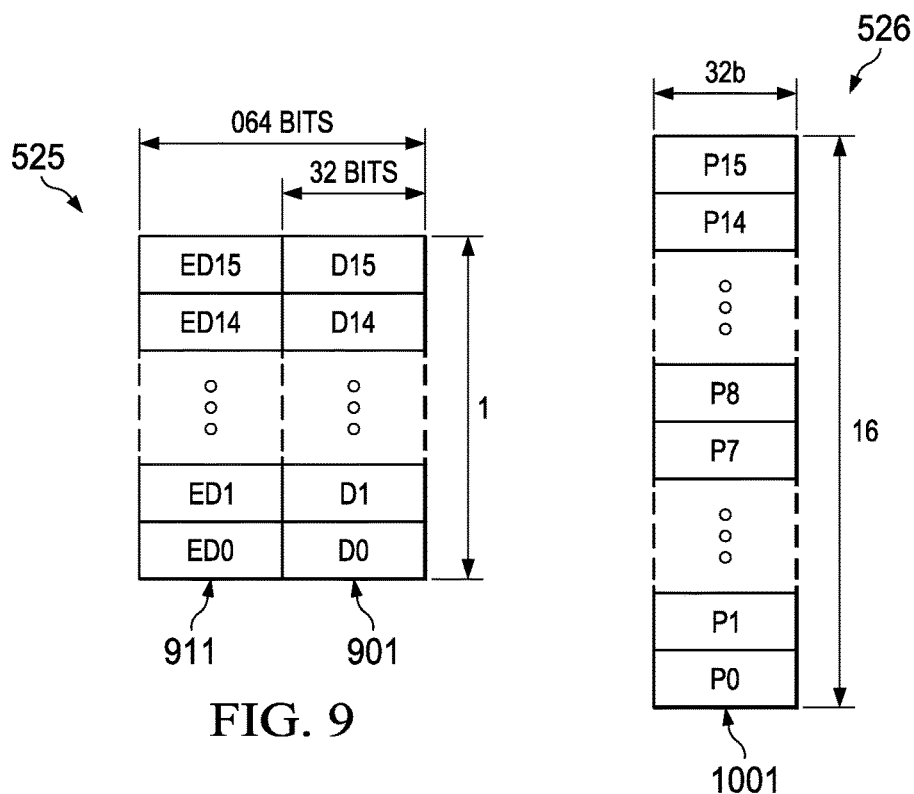
FIG. 9
FIG. 10

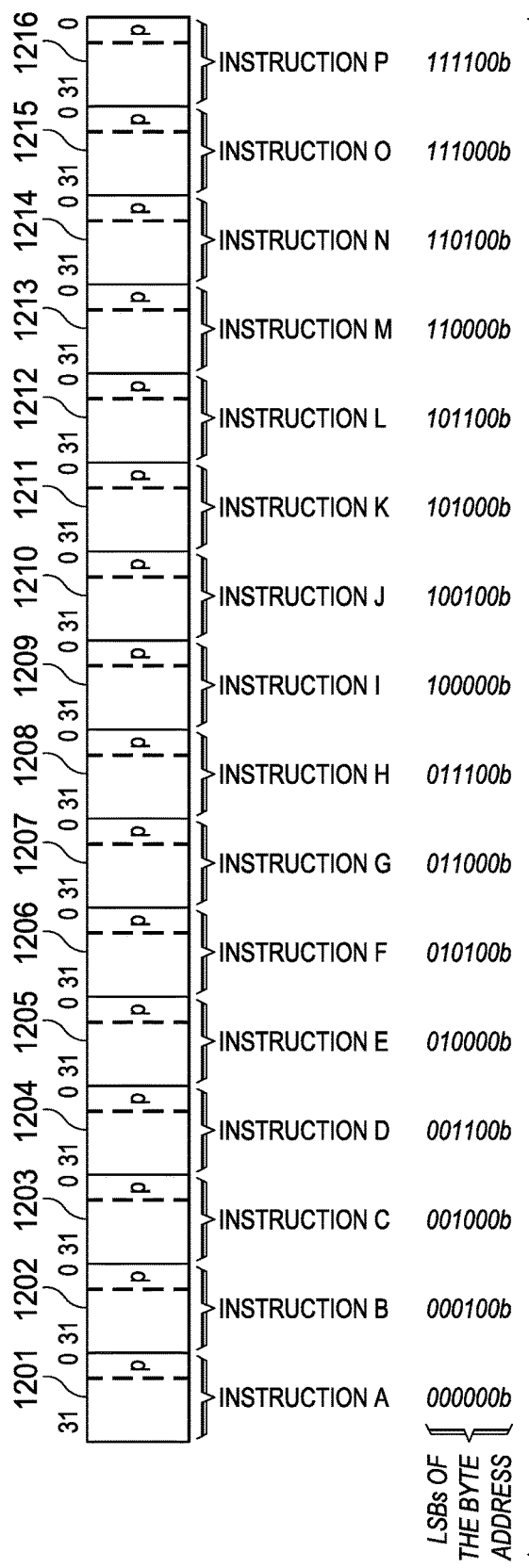
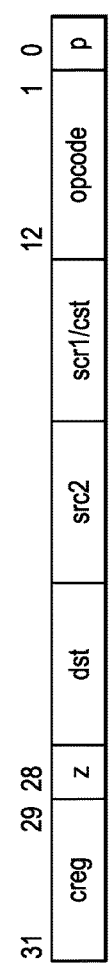
FIG. 12
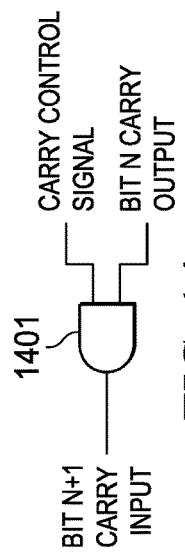
FIG. 14
FIG. 13

|  | P1 | P2 | P3 | P4 |
|---|---|---|---|---|
| 1 | (m, n+3) | (m, n+4) | (m+1, n+3) | (m+1, n+4) |
| 2 | (m, n+4) | (m, n+5) | (m+1, n+4) | (m+1, n+5) |
| 3 | (m+1, n+5) | (m+1, n+6) | (m+2, n+5) | (m+2, n+6) |
| 4 | (m+2, n+6) | (m+2, n+7) | (m+3, n+6) | (m+3, n+7) |
| 5 | (m+3, n+6) | (m+3, n+7) | (m+4, n+6) | (m+4, n+7) |
| 6 | (m+4, n+6) | (m+4, n+7) | (m+5, n+6) | (m+5, n+7) |
| 7 | (m+5, n+5) | (m+5, n+6) | (m+6, n+5) | (m+6, n+6) |
| 8 | (m+6, n+4) | (m+6, n+5) | (m+7, n+4) | (m+7, n+5) |
| 9 | (m+6, n+3) | (m+6, n+4) | (m+7, n+3) | (m+7, n+4) |
| 10 | (m+6, n+2) | (m+6, n+3) | (m+7, n+2) | (m+7, n+3) |
| 11 | (m+5, n+1) | (m+5, n+2) | (m+6, n+1) | (m+6, n+2) |
| 12 | (m+4, n) | (m+4, n+1) | (m+5, n) | (m+5, n+1) |
| 13 | (m+3, n) | (m+3, n+1) | (m+4, n) | (m+4, n+1) |
| 14 | (m+2, n) | (m+2, n+1) | (m+3, n) | (m+3, n+1) |
| 15 | (m+1, n+1) | (m+1, n+2) | (m+2, n+1) | (m+2, n+2) |
| 16 | (m, n+2) | (m, n+3) | (m+1, n+2) | (m+1, n+3) |
| CENTER PIXEL | (m+3, n+3) | (m+3, n+4) | (m+4, n+3) | (m+4, n+4) |

FIG. 19

$X_1 = X_0 >> 1$
$X_2 = X_1 \text{ AND } X_0$
$X_3 = X_2 >> 2$
$X_4 = X_3 \text{ AND } X_2$
$X_5 = X_4 >> 4$
$X_6 = X_5 \text{ AND } X_4$
$X_7 = X_6 >> 1$
$X_8 = X_7 \text{ AND } X_6$

OPTIMIZED FAST FEATURE DETECTION FOR VECTOR PROCESSORS

This application: is a continuation of U.S. patent application Ser. No. 14/581,401 filed Dec. 23, 2014.

CLAIM OF PRIORITY

This application claims priority under 35 U.S.C. 119(a) to Indian Provisional Application No. 5510/CHE/2014 filed Nov. 3, 2014.

TECHNICAL FIELD OF THE INVENTION

The technical field of this invention is digital data processing and more specifically corner pixel detection in images.

BACKGROUND OF THE INVENTION

Feature Detection is an important step in all major machine vision applications. Feature points are important in tracking objects between frames and finding correspondence between 2 or more images. One known technique for corner detection is FAST algorithm proposed in E. Rosten and T. Drummond. "Machine Learning for High-Speed Corner Detection", Computer Vision ECCV 2006, Lecture Notes in Computer Science, Volume 3951, 2006, pages 430 to 443.

Given the importance of Feature Detection in vision applications and FAST being a popular feature point detection algorithm, any hardware system capable of solving machine vision tasks should be capable of providing high performance for FAST algorithm. Machine vision algorithms typically involve similar computation tasks across image blocks or across the entire image and also need to operate at high frame rate per second (fps). Vector SIMD engines are well suited for machine vision tasks. The data overlap that typically occurs in machine vision kernels can be effectively exploited by a vector SIMD engine for better performance compared to a scalar engine.

SUMMARY OF THE INVENTION

This invention enables effective corner detection of pixels of an image using the FAST algorithm using a vector SIMD processor. Rather than loading the 16 peripheral pixels for each center pixel in separate operations, this invention loads an 8×8 pixel block. This 8×8 pixel block includes four 7×7 pixel blocks including the 16 peripheral pixels to be tested for each of four center pixels. This invention rearranges the 64 pixels of the 8×8 block, ignoring some pixels and duplicating others, to form a 16 element array for each center pixel. Each element in the 16 element array is the pixel value of a corresponding one of the 16 peripheral pixels for a corresponding center pixel. This rearrangement preferably employs a vector permutation instruction.

This invention uses vector SIMD subtraction and compare and vector SIMD addition and compare to make the FAST algorithm comparisons. The result is 16-bit words having a 0 or 1 state dependent on the comparison results. The N consecutive pixels determinations of the FAST algorithm are made from the results of plural shift and AND operations. The corresponding center pixel is marked a corner or not a corner dependent upon of the results of plural shift and AND operations.

BRIEF DESCRIPTION OF THE DRAWINGS

These and other aspects of this invention are illustrated in the drawings, in which:

FIG. 8 illustrates the local vector register file shared by the multiply and correlation functional units;

FIG. 9 illustrates local register file of the load/store unit;

FIG. 10 illustrates the predicate register file;

FIG. 12 illustrates sixteen instructions of a single fetch packet;

FIG. 13 illustrates an example of the instruction coding of instructions used by this invention;

FIG. 14 illustrates the carry control for SIMD operations according to this invention;

FIGS. 17A to 17D together illustrate four 7×7 blocks of the FAST algorithm contained within a single 8×8 block;

FIG. 19 illustrates rearranged pixels instruction for each center pixel of 7×7 blocks of the FAST algorithm within an 8×8 block;

DETAILED DESCRIPTION OF PREFERRED EMBODIMENTS

Figure 1:
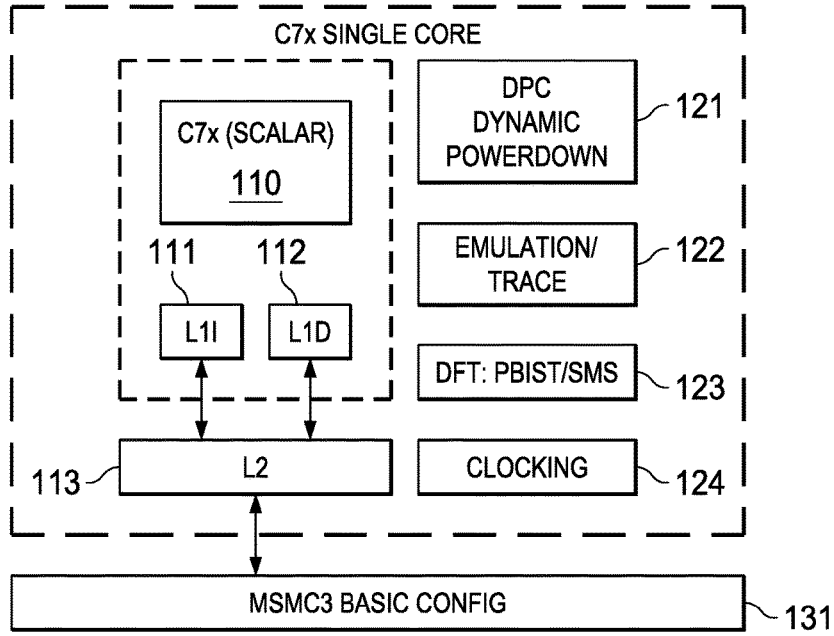
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I)

111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
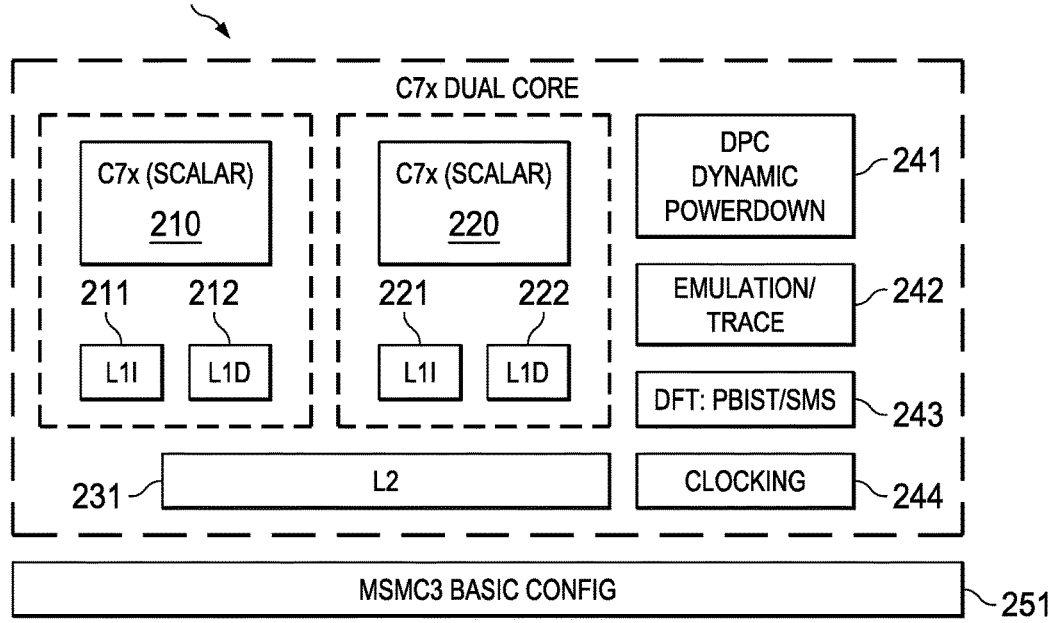
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 245, emulation/trace circuits 116, design for test (DST) programmable built-in self test (PBIST) circuit 117 and clocking circuit 118. This single integrated circuit may also include memory controller 251.

Figure 3:
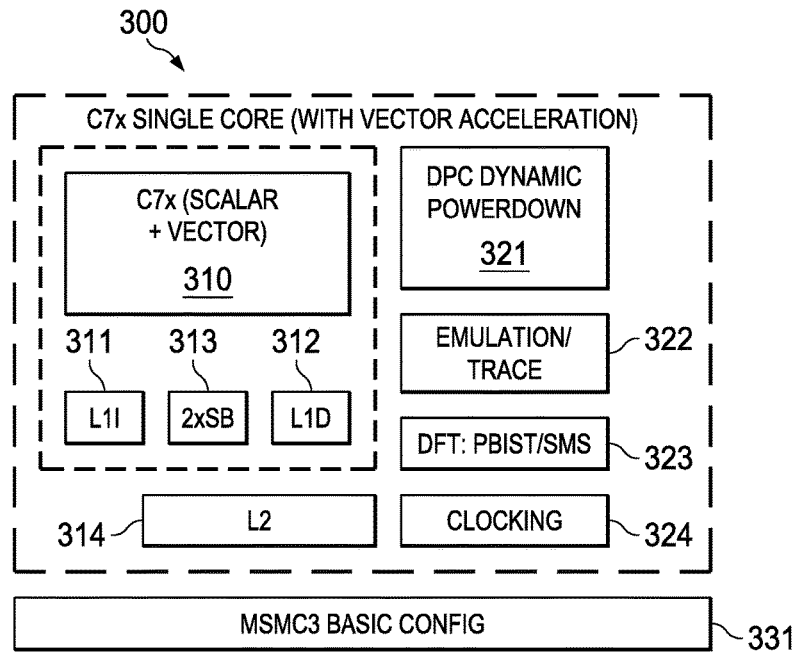
FIG. 3 illustrates a single core vector processor according to a further embodiment of this invention.
Figure 4:
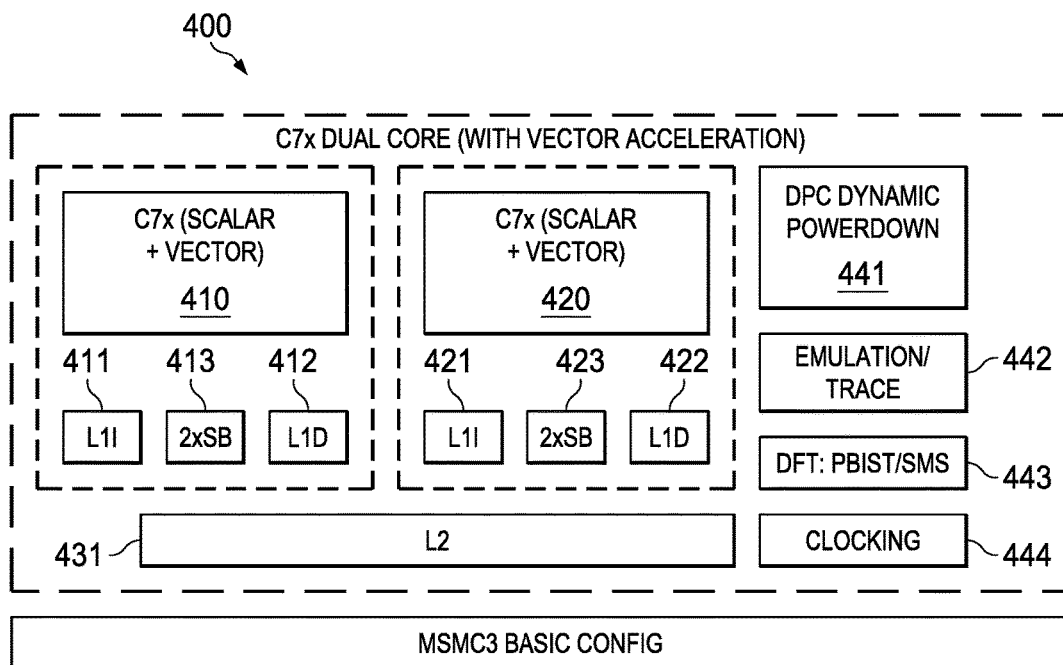
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
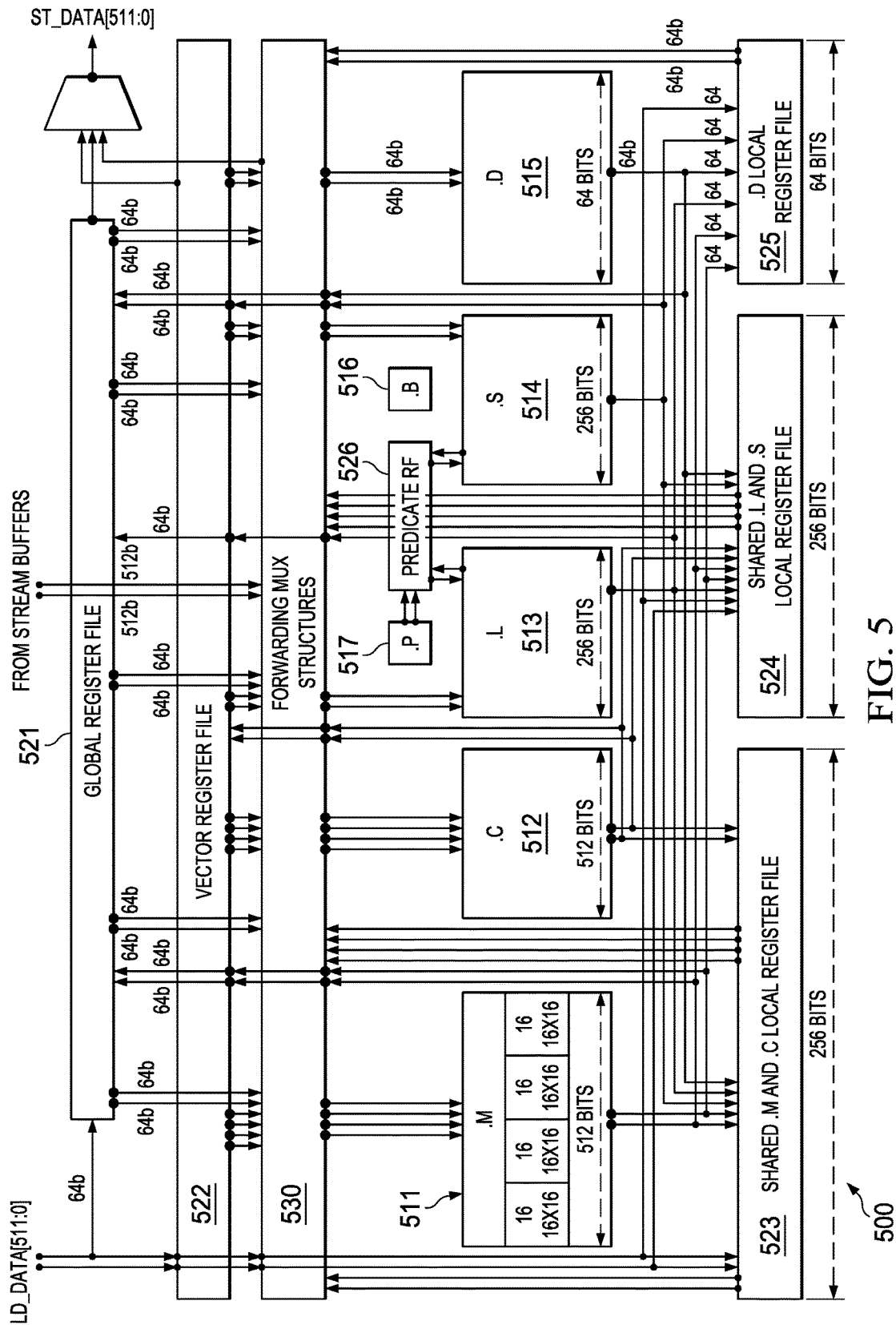
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. The permit multi-dimensional memory accesses. They increase the available bandwidth to the functional units. They minimize the number of cache miss stall since the stream buffer can bypass L1D cache and L2 cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily preforms multiplications. Multiply unit 511 accepts up to two double vector operands and produces up to one double vector result. Multiply unit 511 is instruction configurable to perform the following operations: various integer multiply operations, with precision ranging from 8-bits to 64-bits multiply operations; various regular and complex dot product operations; and various floating point multiply operations; bit-wise logical operations, moves, as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table look-aside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
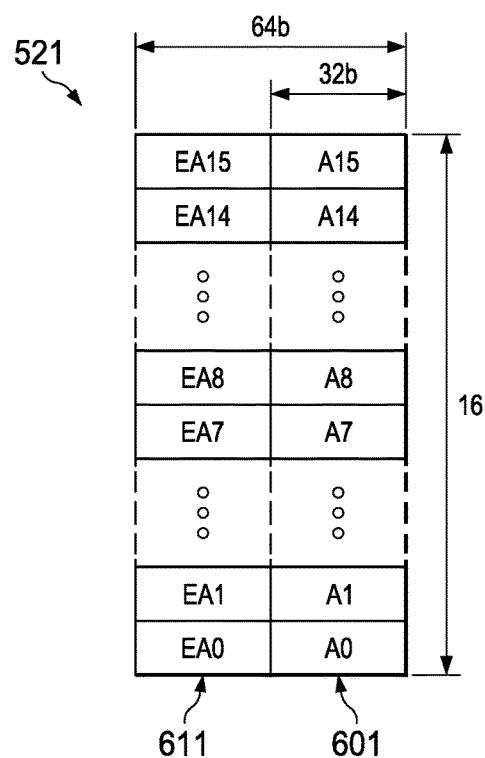
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
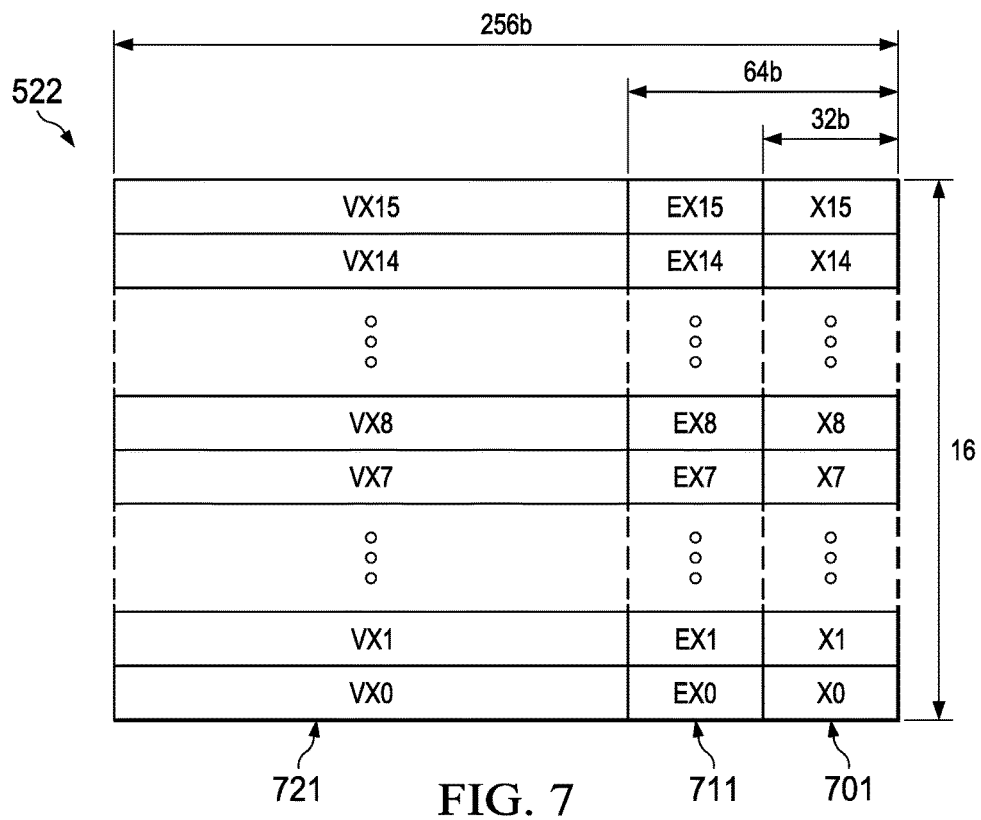
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bot double vector data (designated DVX0 to DVX12, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 701), 64-bits of scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 701) or 64-bits of scalar data (designated registers ED0 to ED15 711). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

FIG. 10 illustrates the predicate register file 517. There are sixteen registers 32-bit registers in predicate register file 517. Predicate register file 517 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 517. Transfers between predicate register file 517 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packed of fixed length further described below. All instructions require the same number of pipeline phases for fetch and decode, but require a varying number of execute phases.

Figure 11:
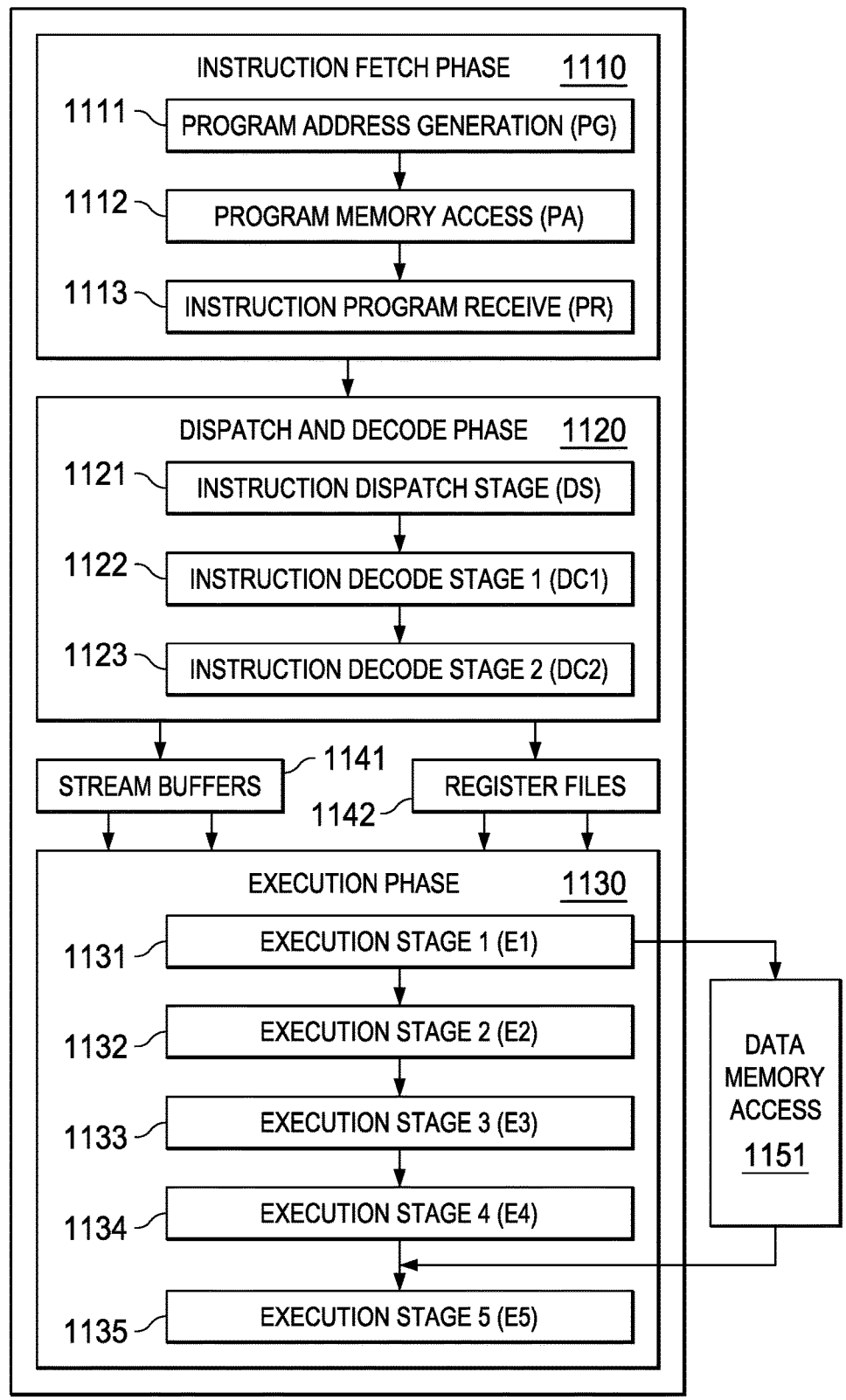
FIG. 11 illustrates the pipeline phases of the central processing unit according to a preferred embodiment of this invention.

FIG. 11 illustrates the following pipeline phases: program fetch phase 1110, dispatch and decode phases 1110 and execution phases 1130. Program fetch phase 1110 includes three stages for all instructions. Dispatch and decode phases include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of and instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1110 include instruction dispatch to appropriate execution unit stage 1121 (DS), instruction pre-decode stage 1122 (D1); and instruction decode, operand reads stage 1222 (D2). During instruction dispatch to appropriate execution unit stage 1121 (DS) the fetch packets are split into execute packets and assigned to the appropriate functional units. During the instruction pre-decode stage 1122 (D1) the source registers, destination registers, and associated paths are decoded for the execution of the instructions in the functional units. During the instruction decode, operand reads stage 1222 (D2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional |  | creg |  | z |
| --- | --- | --- | --- | --- |
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit creg/z fields for the instructions which are in the same execute packet. Table 3 shows the coding of such a condition code extension slot.

TABLE 3

| Bits | Functional Unit |
| --- | --- |
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals |
| --- | --- |
| 8 bits | –000 0000 0000 0000 0000 0000 0000 0000 |
| 16 bits | –101 0101 0101 0101 0101 0101 0101 0101 |
| 32 bits | –111 0111 0111 0111 0111 0111 0111 0111 |
| 64 bits | –111 1111 0111 1111 0111 1111 0111 1111 |
| 128 bits | –111 1111 1111 1111 0111 1111 1111 1111 |
| 256 bits | –111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Feature Detection is an important step in all major machine vision applications. Feature points are important in tracking objects between frames and finding correspondence between 2 or more images. One known technique for corner detection is FAST algorithm proposed in E. Rosten and T. Drummond. "Machine Learning for HighSpeed Corner Detection", Computer Vision ECCV 2006, Lecture Notes in Computer Science, Volume 3951, 2006, pages 430 to 443.

Given the importance of Feature Detection in vision applications and FAST being a popular feature point detection algorithm, any hardware system capable of solving machine vision tasks should be capable of providing high performance for FAST algorithm. Machine vision algorithms typically involve similar computation tasks across image blocks or across the entire image and also need to operate at high frame rate per second (fps). Vector SIMD engines such as previously described are well suited for machine vision tasks. The data overlap that typically occurs in machine vision kernels can be effectively exploited by a vector SIMD engine for better performance compared to a scalar engine.

Figures 15, 18:
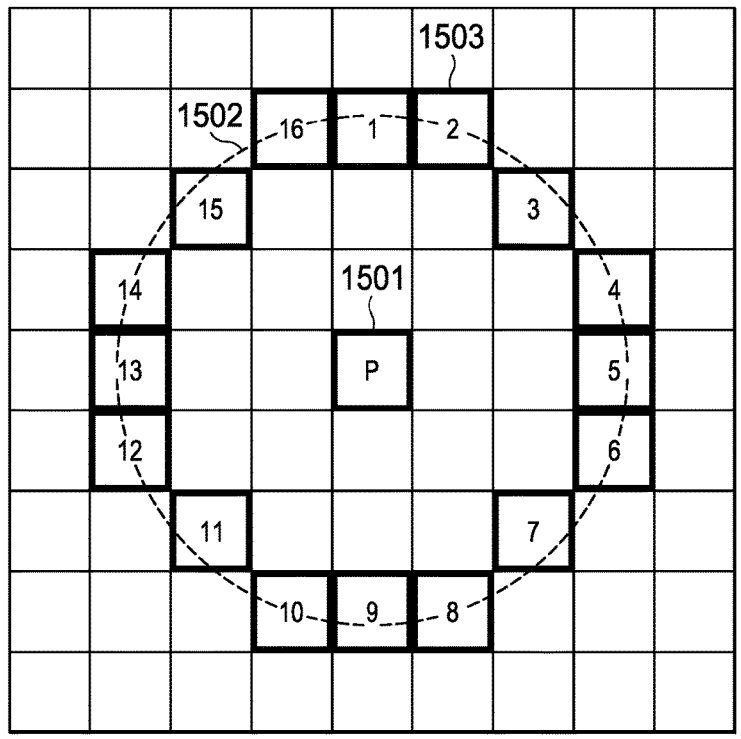
FIG. 15 is a FAST algorithm peripheral pixel pattern (prior art)
FIG. 18 illustrates the locations of pixels within the 8×8 block relative to the 16 FAST peripheral pixel locations for the four center pixels.

FIG. 15 illustrates aspects of the FAST algorithm (prior art). The FAST algorithm picks a 7×7 window around each pixel 1501 P. Corner detection is based on comparison of pixel intensities for the 16 pixels 1503 in a circle 1502 around center pixel 1501 P. The FAST algorithm determines if there is contagious arc of N or more pixels which are either: all pixels are brighter than p+t; or all pixels are darker than p–t, where t is a threshold.

The FAST algorithm is inherently simple. The sum, difference and comparisons are easily accomplished via a vector SIMD engine having a data size matching the pixel size. This algorithm poses certain challenges for a vector SIMD engine. The pixel access pattern around each pixel in a 7×7 window illustrated in FIG. 15 is fixed. However, access is required to non-sequential locations and hence not favorable to a simple vector load instruction. Suppose you chose to operate on SIMD width of points in parallel, such as advantageous for the sum, difference and comparison. Then the vector SIMD engine must perform 16 different vector loads for all points on the circle per SIMD width points.

Figure 16:
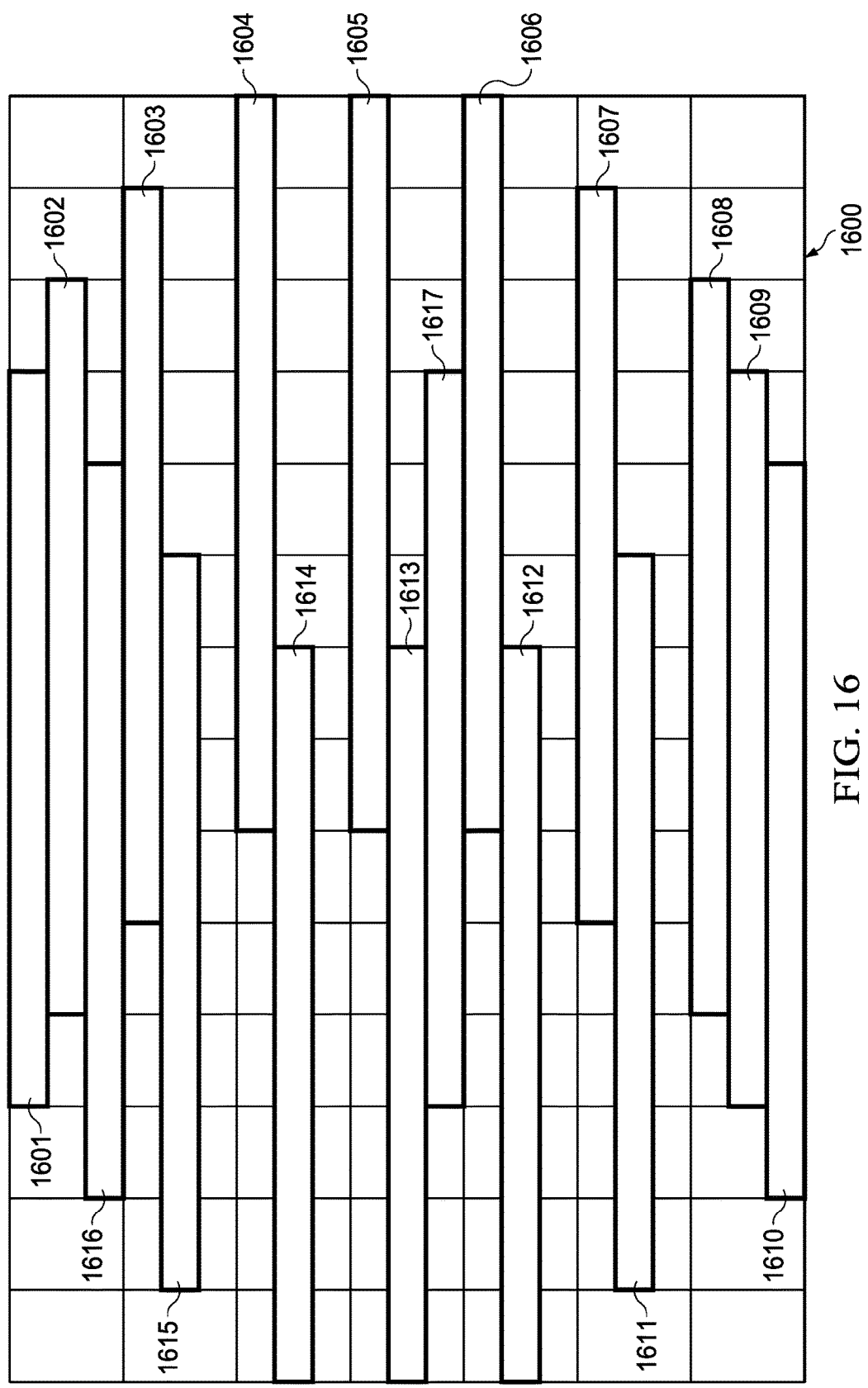
FIG. 16 is a load pattern for FAST of the prior art.

A traditional technique used for the pixel load operations involves separate vector loads of all the 16 pixels on the arc illustrated in FIG. 15 and an additional vector load for the center pixel. These vector loads are illustrated in FIG. 16. The vector loads illustrated in FIG. 16 assume an 8 pixel width. This vector load pattern has several short comings. This uses 17 vector loads 1601 to 1617 from 7×14 image block 1600 per each center pixel to be considered. This vector load pattern does not exploit data overlap. Vector loads triples (1601, 1602, 1616), (1605, 1613, 1617) and (1608, 1609, 1610) have large data overlap. This data access overlap is not exploited using the prior technique. Even following such vector loads, the data is not well arranged for the comparisons of the FAST algorithm. The 17 vector loads would place the needed pixel at a consistent place within the destination register at the expense of poorly handled data overlap in the vector loads.

Another challenge is the need to check every point on the arc for consecutive N points which are all brighter than or all darker than the center point by the threshold t. This requires checking 16+(N−1) combinations. The typically employed prior technique performs 16 vector comparison operations. The result of each comparison falls into a separate register or memory location. These separate comparison results needs to be collated to determine if there is a continuous arc of N brighter/darker pixels on the circle. This kind of collation is not implemented favorable in a vector SIMD engine. A typical prior technique runs a loop for 16+(N−1) times, each iteration updating a counter to the number of similar consecutive pixels on the arc. Each loop must keep track of the current status and reset the counter selectively for the appropriate elements of the vector at each step while maintaining the status for other elements. Vector SIMD engines which work well when we need to perform same operation of multiple sets of data do not handle well this level of conditional logic flow.

Figures 17A, 17B:
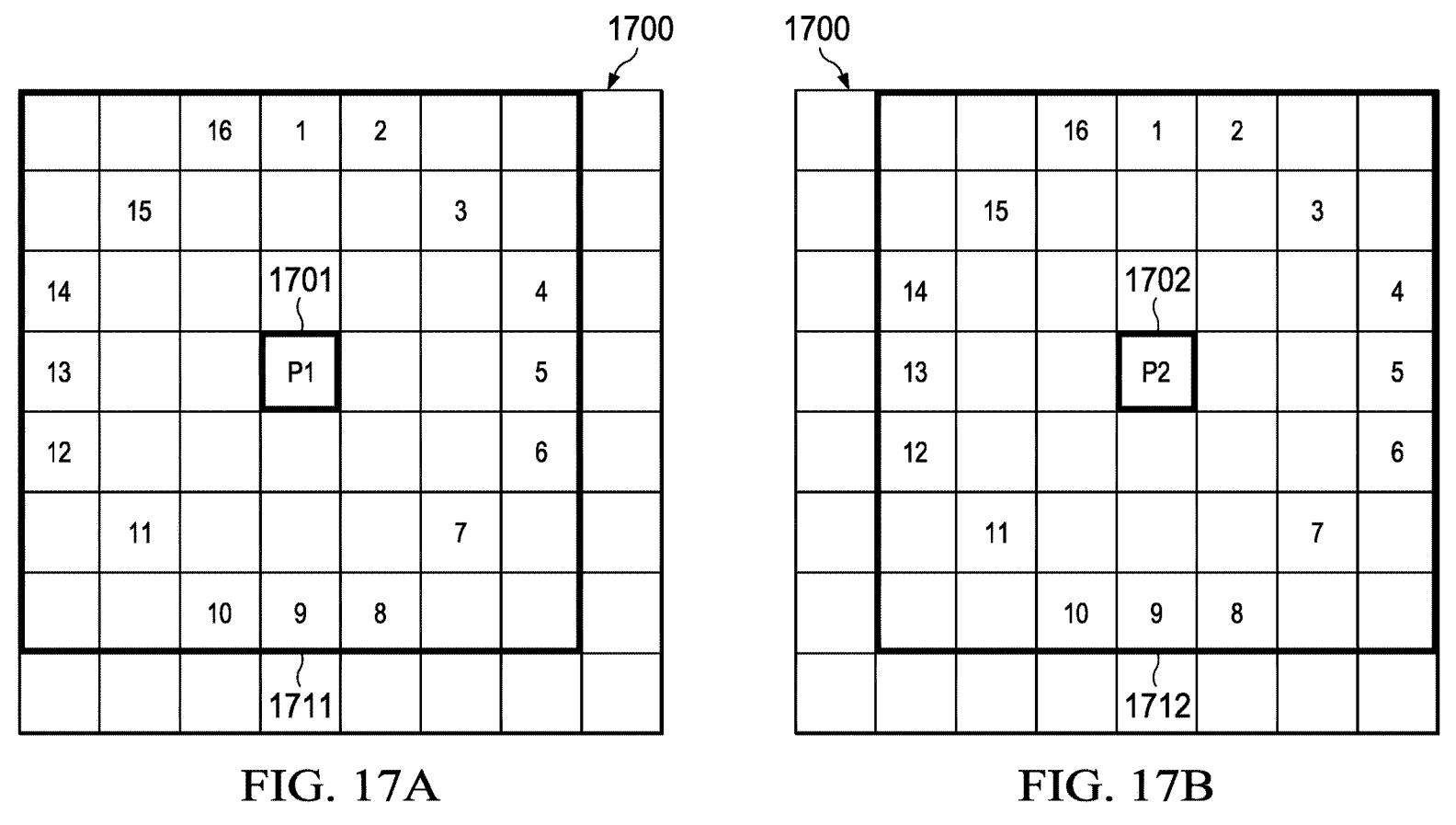
Figures 17C, 17D:
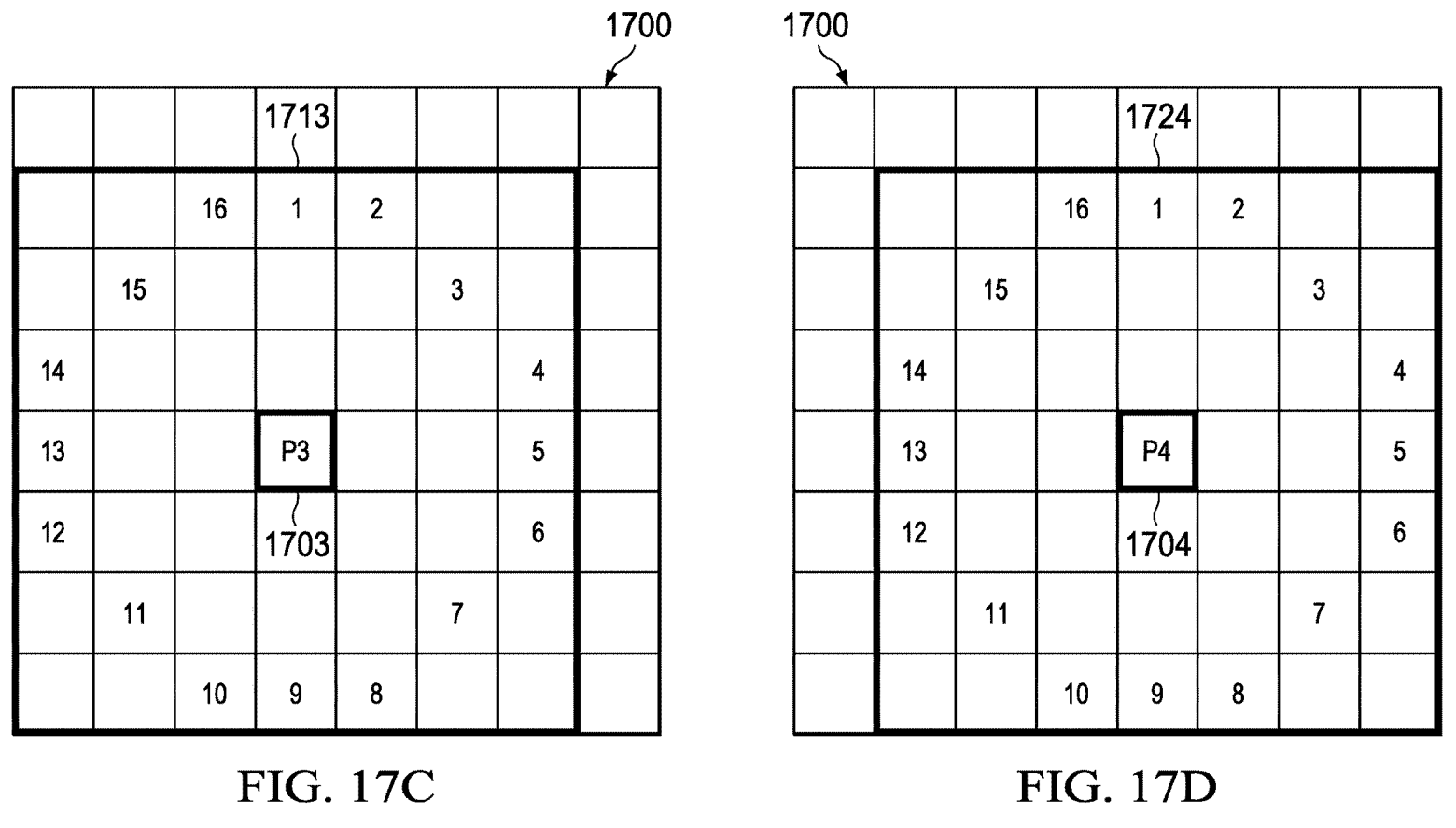

This invention includes techniques to adapt the FAST algorithm to a vector SIMD engine. A first technique addresses the data load problem. This begins with the observation that an 8×8 pixel image block includes four 7×7 blocks such as used in the FAST algorithm. This is illustrated in FIG. 17. FIG. 17A illustrates that an 8×8 pixel image block 1700 includes 7×7 FAST block 1711 having center pixel 1701. FIG. 17B illustrates that image block 1700 includes 7×7 FAST block 1712 having center pixel 1702. FIG. 17C illustrates that image block 1700 includes 7×7 FAST block 1713 having center pixel 1703. FIG. 17D illustrates that image block 1700 includes 7×7 FAST block 1714 having center pixel 1704. Loading image block 1700 requires eight 8 pixel wide loads, one for each row. A steaming engine (such as streaming engine 313, 413 or 423 described above) may be set up to handle this block loading. Since SIMD operations typically have data widths that are an integral product of 2 ($2^N$), such an 8 pixel wide load would generally be within the supported data width of the vector SIMD engine. This loads the data for four center pixels 1701, 1702, 1703 and 1704. The prior technique illustrated in FIG. 16 requires 68 such 8 pixel wide loads for four center pixels.

A second part of this aspect of the invention, assembles the 16 pixel values for each of the four center pixels into a 16 pixel wide data words. The exact register file realization of these four 16 pixel wide data words depends upon the pixel size relative to the data register width. If the pixel size is four bits, then four such 16 pixel wide data words can be stored in a single 256-bit vector register. If the pixel size is eight bits, then two such 16 pixel wide data words can be stored in a single 256-bit vector register. If the pixel size is sixteen bits, then a single 256-bit vector register can store on such 16 pixel wide data word. One skilled in the art would recognize that other combinations of pixel size and data register size are feasible.

The second part of this aspect moves data from the originally loaded 64 pixels in the 8×8 block into four 16 pixel data words corresponding to the four center points 1701, 1702, 1703 and 1704. FIG. 18 illustrates the locations of pixels within the 8×8 block relative to the 16 FAST locations illustrated in FIG. 15 for the four center pixels. Locations marked $1_1$ to $16_1$ are the 16 pixels for center pixel P1. Locations marked $1_2$ to $16_2$ are the 16 pixels for center pixel P2. Locations marked $1_3$ to $16_3$ are the 16 pixels for center pixel P3. Locations marked $1_4$ to $16_4$ are the 16 pixels for center pixel P4. FIG. 18 includes row numbers m to m+7 and column numbers n to n+7 for reference. For example, pixel (m,n+3) corresponds to pixel 1 for center pixel P1 ($1_1$) and pixel 16 for center pixel P2 ($16_2$). Note that some pixels of 8×8 pixel block 1800 are used twice, some pixels are used only once and some pixels are not used.

FIG. 19 shows the coordinates for each of the 16 FAST pixels for each of the four center pixels. FIG. 19 also shows the coordinates of each of the four center pixel. As shown each of the 16 FAST pixels for each of the four center pixels is stored at a known location within the 8×8 pixel block. The vector SIMD engine includes various permute, swap, deal and extract functions permitting assembly of the four 16 pixel data words illustrated in FIG. 19. The exact nature of this rearrangement depends on the available instruction of the SIMD vector engine implementing this process. At the most basic level a scalar Byte MOVE instruction could be used for each of the 64 pixel values to be rearranged.

Figure 20:
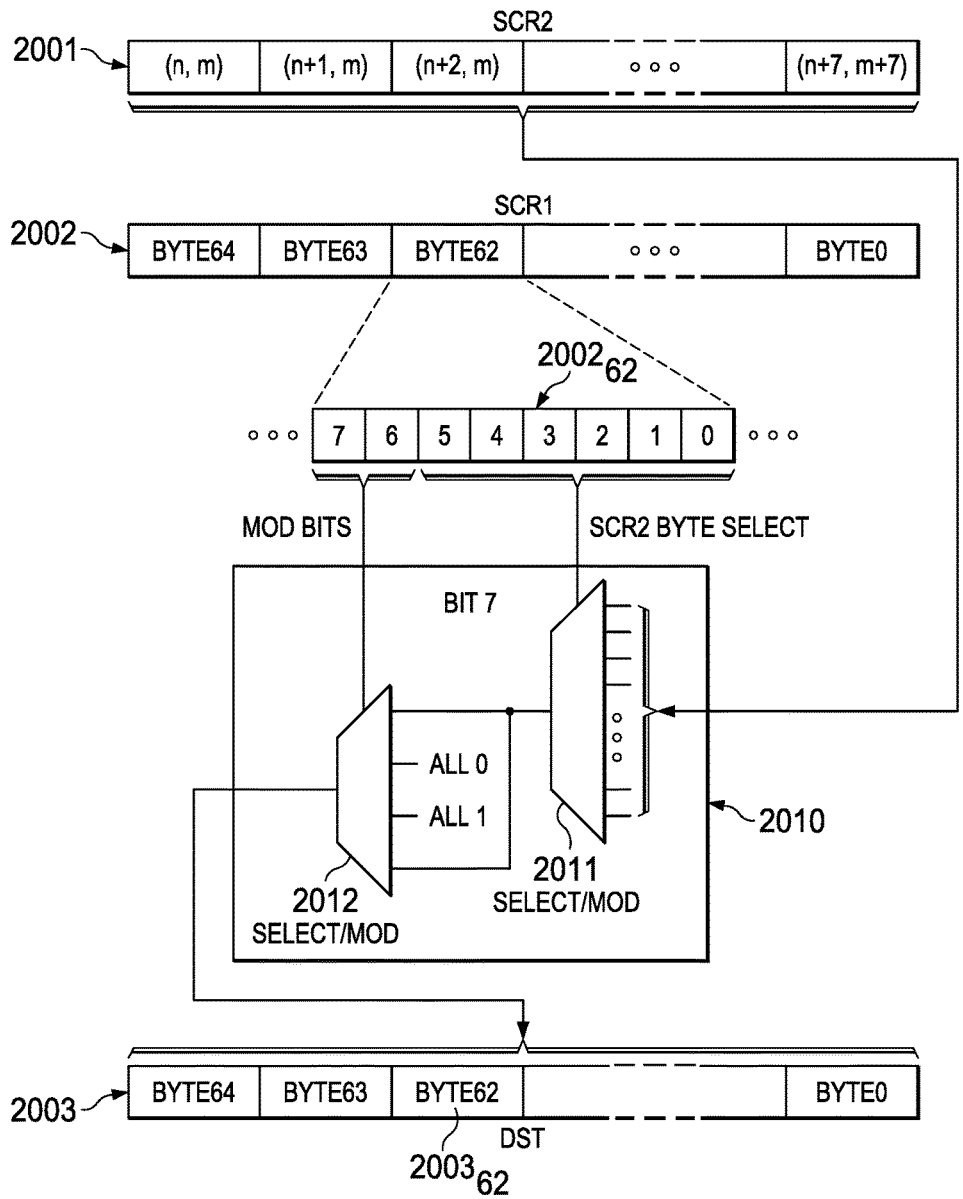
FIG. 20 schematically illustrates operation of a vector permute instruction such as applicable to this invention.
Figure 21:
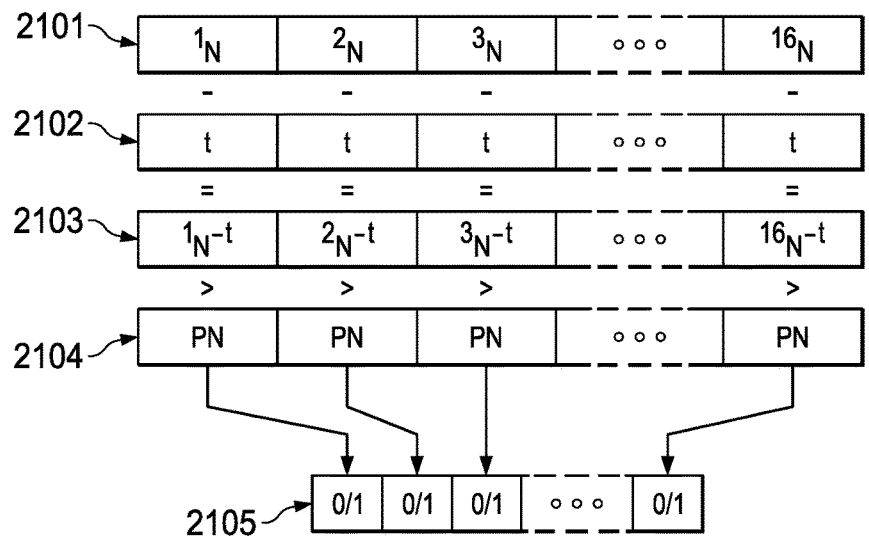
FIG. 21 illustrates vector SIMD subtraction and comparison operations to determine whether each of the peripheral pixels is greater than the center pixel plus a threshold.

The preferred embodiment of this invention includes an instruction particularly suited to this rearrangement task. The correlation unit 512 preferably implements a vector permute (VPERM) instruction enabling all byte permute patterns. FIG. 20 schematically illustrates operation of a VPREM instruction. The VPERM instruction preferably has a first type employing two 256-bit vector operands and a second type employing two 512-bit double vector operands. The vector or double vector operand 2002 designated Src2 (see instruction coding illustrated in FIG. 13) is the data to be permuted. The vector or double vector operand 2001 designated Scr1 holds control bits for the permuted data. The vector of double vector 2003 designated the destination (DST) receives the permuted data. Each byte of the register 2001 (SCR1) controls the data stored in the corresponding byte of register 2003 (DST). Thus bits within each byte (such as byte 62 $2001_{62}$ illustrated in FIG. 20) determines the data stored in the same byte (such as byte 62 $2003_{62}$ illustrated in FIG. 20).

FIG. 20 shows the definition of each bit of the bytes of operand 2001. Bits 0 to 5 of each byte designate a byte of the operand 2002 selected for the corresponding byte of destination 2003. These six bit can identify one of $2^6$=64 bytes of the data operand 2002. Bits 6 and 7 of each byte designate a modification of the selected byte of operand 2002 as shown in Table 5.

TABLE 5

| Bits [7, 6] | Meaning |
|---|---|
| 0 0 | No change |
| 0 1 | Fill with 0's |
| 1 0 | Fill with 1's |
| 1 1 | Fill with bit 7 of selected byte |

The "Fill with bit 7" option may be used for sign extension when the destination SIMD data size is greater than the source SIMD data size.

FIG. 20 illustrates select/mod unit 2010 which makes this data selection of exemplary byte 62. Multiplexer 2011 receives each byte from operand 2002 at the data input. Bits 0 to 5 of the corresponding byte 62 of operand 2001 drive the select input of multiplexer 2011 selecting one of the bytes of operand 2002 to output. The output of multiplexer

2011 supplies a first input of multiplexer 2012. A second input of multiplexer 2012 receives all 0's (0000 0000). A third input of multiplexer 2012 receives all 1's (1111 1111). The last input receives duplicates of bit 7 of the data from multiplexer 2011. As noted above this option is useful for sign extension. The particular selection of multiplexer 2012 is shown in Table 5. The output of multiplexer 2012 is stored in the corresponding byte of destination 2003.

The VPERM instruction is preferably used in implementing the FAST corner determination as follows. Eight operands to use as control words are pre-calculated. As seen from FIGS. 18 and 19 the four data words needed for the sixteen FAST pixels for each center pixel is known. The exact coding of these control words depends upon the pixel value size, the big endian/little endian ordering in the register and the like. Those skilled in the art would be able to calculate the control word operand values based upon the design choices of data representation. For the data words including the sixteen FAST pixel values for each center pixel, the control word specifies the source pixel value (SCR2 byte) for the first 16 SIMD slots in the destination. In the preferred embodiment the next 16 SIMD slots store the same control data for reasons further explained below. The remaining 32 SIMD slots can be set to all 0 because they will not be needed later. This accounts for four pre-calculated control words. The other four pre-calculated control words select respective center pixel values. In this example, each of these control words selects the center pixel value (whose location is known from FIG. 18) for each of the first 32 SIMD slots. The other 32 SIMD slots can be set to all 0's.

After pre-calculation of the control words the data rearrangement takes place as follows. In this example assume 8-bit pixel values stored in a double vector (512-bit) register pair. A first instance of VPERM instruction using the center pixel P1 control word produces a double vector destination with the first 32 SIMD slots filled with two instances of the 16 FAST pixel values. The remaining 32 SIMD slots will not be used later (in this example) and so can be zero filled. A second instance of the VPERM instruction using the control word for the P1 center pixel produces a double vector destination with the first 32 SIMD slots filled with the center pixel P1 value. These two instances of the VPERM instruction repeat for each of the three other center pixels P2, P3 and P4. The result is for each center pixel; a first data word with the 16 FAST pixel values, duplicated; and a second data word with the center pixel value duplicated in every SIMD slot.

In this example the input pixels are stored in a double vector (512 bits) but only a vector (256 bits) are later used. It is feasible to use the double vector version of the VPERM instruction to produce a double vector output encompassing the 16 FAST pixel values for two center pixels. The control word could be per-calculated to produce: in SIMD slots 15-0, the 16 FAST pixel values for center pixel P1; in SIMD slots 31-16, a repeat of the 16 FAST pixel values for center pixel P1; in SIMD slots 32-55, the 16 FAST pixel values for center pixel P2; in SIMD slots 63-56, a repeat of the 16 FAST pixel values for center pixel P2. A second pre-calculated control word would generate similar results for center pixels P3 and P4. Double vector instructions use two adjacent vector data registers. Later use of the rearranged data could employ vector instructions with only a proper one of the two vector data registers as operands.

Once arranged in the data words illustrated in FIG. 19, the sum, difference and comparisons can be made using SIMD instructions. This technique uses one constant for all the pixels and one pixel value for each center pixel. The constant has the value of the threshold t in each SIMD slot of a register. A vector SIMD subtraction subtracts the threshold t from the FAST pixel values. The SIMD slot size is equal to the pixel size in this example. This is illustrated in FIG. 20. A first register source 2001 includes the respective pixel values of the 16 FAST pixels for center pixel PN ($1_N$ . . . $16_N$). Second register source 2002 includes the threshold t in every SIMD slot. As shown in FIG. 20 a SIMD subtract operation yields the difference 2003 between the respective pixel values of the 16 FAST pixels and the threshold t ($1_N$–t . . . $16_N$–t). Register source 2003 stores the center pixel value PN in every SIMD slot. A vector SIMD compare operation determines a one bit result (0/1) for each SIMD slot depending on the relationship between the two SIMD slot operands. This operation preferably uses one of arithmetic unit 513 or arithmetic unit 514. The one bit per SIMD slot results are stored in an instruction designated one of the registers (2105) of predicate register file 526. Use of these results will be described below.

Figure 22:
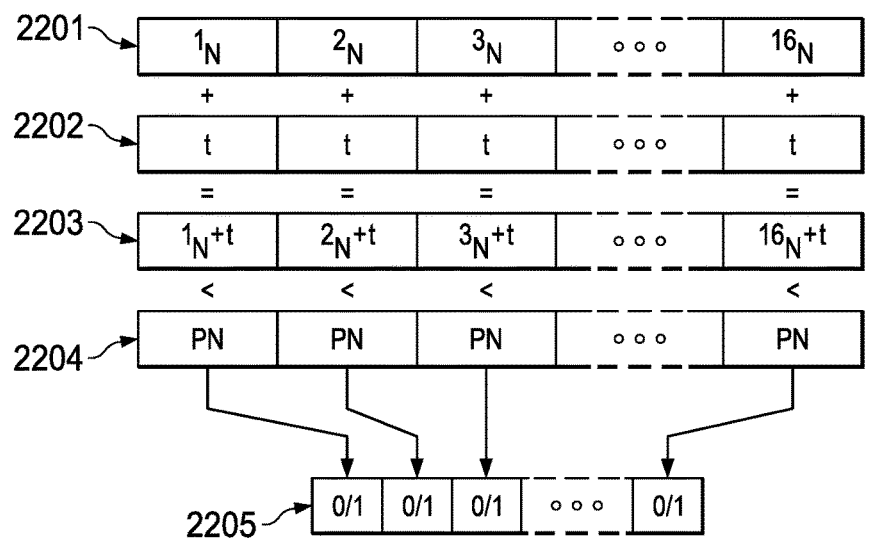
FIG. 22 illustrates vector SIMD addition and comparison operations to determine whether each of the peripheral pixels is less than the center pixel minus a threshold.

FIG. 22 illustrates a second set of SIMD operations to produce a similar set of bits for the other condition. Register source 2001 includes the respective pixel values of the 16 FAST pixels for center pixel PN ($1_N$ . . . $16_N$). Second register source 2002 includes the threshold t is every SIMD slot. As shown in FIG. 22 a SIMD addition operation yields the sum 2203 between the respective pixel values of the 16 FAST pixels and the threshold t ($1_N$+t . . . $16_N$+t). Register source 2003 stores the center pixel value PN in every SIMD slot. A vector SIMD compare operation determines a one bit result (0/1) for each SIMD slot depending on the relationship between the two SIMD slot operands. This operation preferably uses one of arithmetic unit 513 or arithmetic unit 514 and stored results in an instruction designated one of the registers (2205) of predicate register file 526.

A further aspect of this invention determines if N consecutive pixels are similar. This uses a SHIFT and AND based technique on the comparison results described above. Since the result of each comparison operation for pixels arranged in the pattern above yields consecutive 16 bits corresponding to the 16 pixels used in comparison, there is no further operation required to arrange data needed for the SHIFT and AND based check discussed below. Since FAST algorithm is popularly developed with number of consecutive pixels, N=9 (also known as FAST9), this example finds whether there are 9 consecutive pixels which are either brighter or darker than the pixel at the center by a given threshold. As noted the vector comparison results are 1 if the corresponding pixel is a candidate for determining a corner pixel (pixel value far from center pixel value) and 0 if the corresponding pixel is not a candidate (pixel value near to the center pixel value).

Figures 23, 24A:
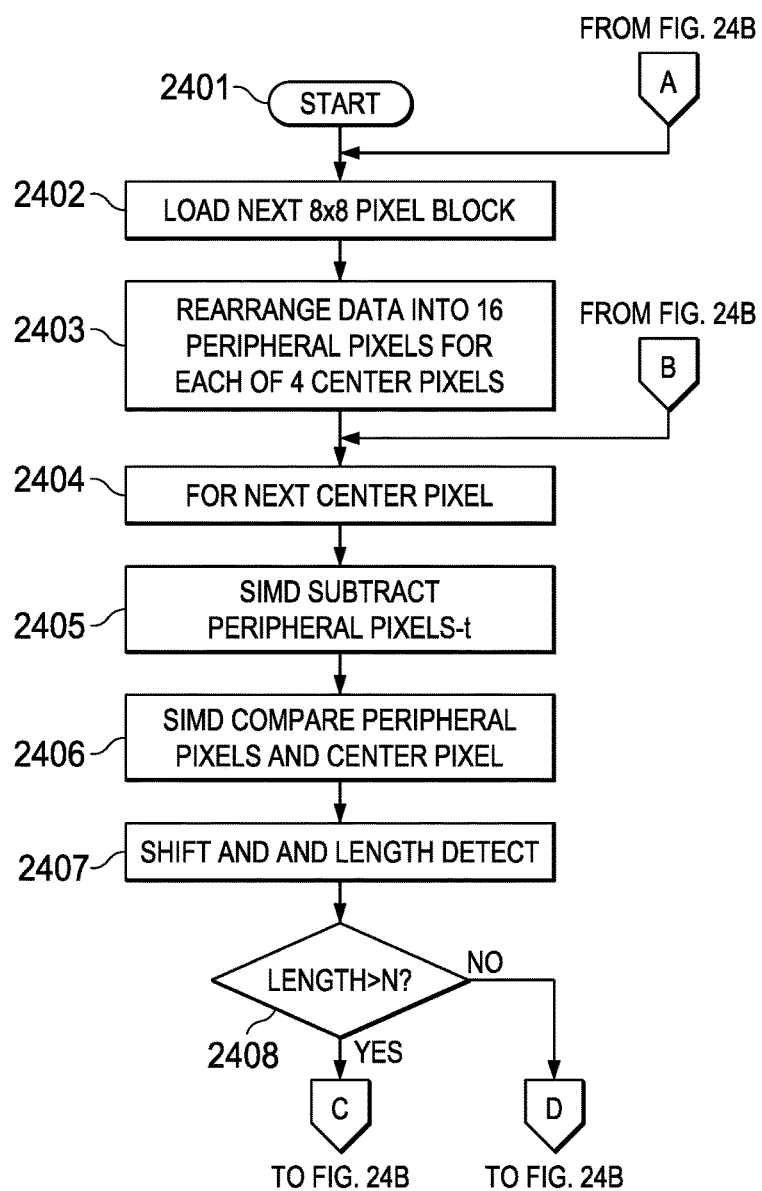
FIG. 23 illustrates the steps in a SHIFT and ADD method of determining whether there are N consecutive pixels satisfying the threshold requirement.
FIGS. 24A and 24B together illustrate a flow chart of major aspects of this invention for determining corner pixels in an image.

A code example of this consecutive search technique is illustrated in FIG. 23. A process of this type is used on both the pixel greater than the center pixel plus the threshold. The repeated shift and AND operations each reduce the length of a set of consecutive pixels satisfying the greater than PN+t test (2105) or satisfying the less than PN–t test (2205). After the shift and AND steps only comparison results having more than the corresponding consecutive number are non-zero. Note the $2^N$ progression in the shift amounts before the last shift step.

This technique has logarithmic convergence. This technique requires just 4 steps in contrast to the 16+(9-1)=24 steps required in the traditional approach. Another commonly used length is N=12 (FAST12). Determination of this length also requires just the 4 steps with the shift factor in the last step changed to 4 from 1.

To preserve the possibility of determining N consecutive results for sequences that cross the boundary from pixel 16 to pixel 1, the shift operations are actually performed on 32-bit data words with the 16-bit comparison results repeated in the upper and lower 16-bits of the 32-bit data word. Production of these data word via the VPERM instruction was described above. Alternately, a 16-bit data word could be used with rotates that wrap the least significant bit(s) around to the most significant bit(s) instead of shifts.

Figure 24B:
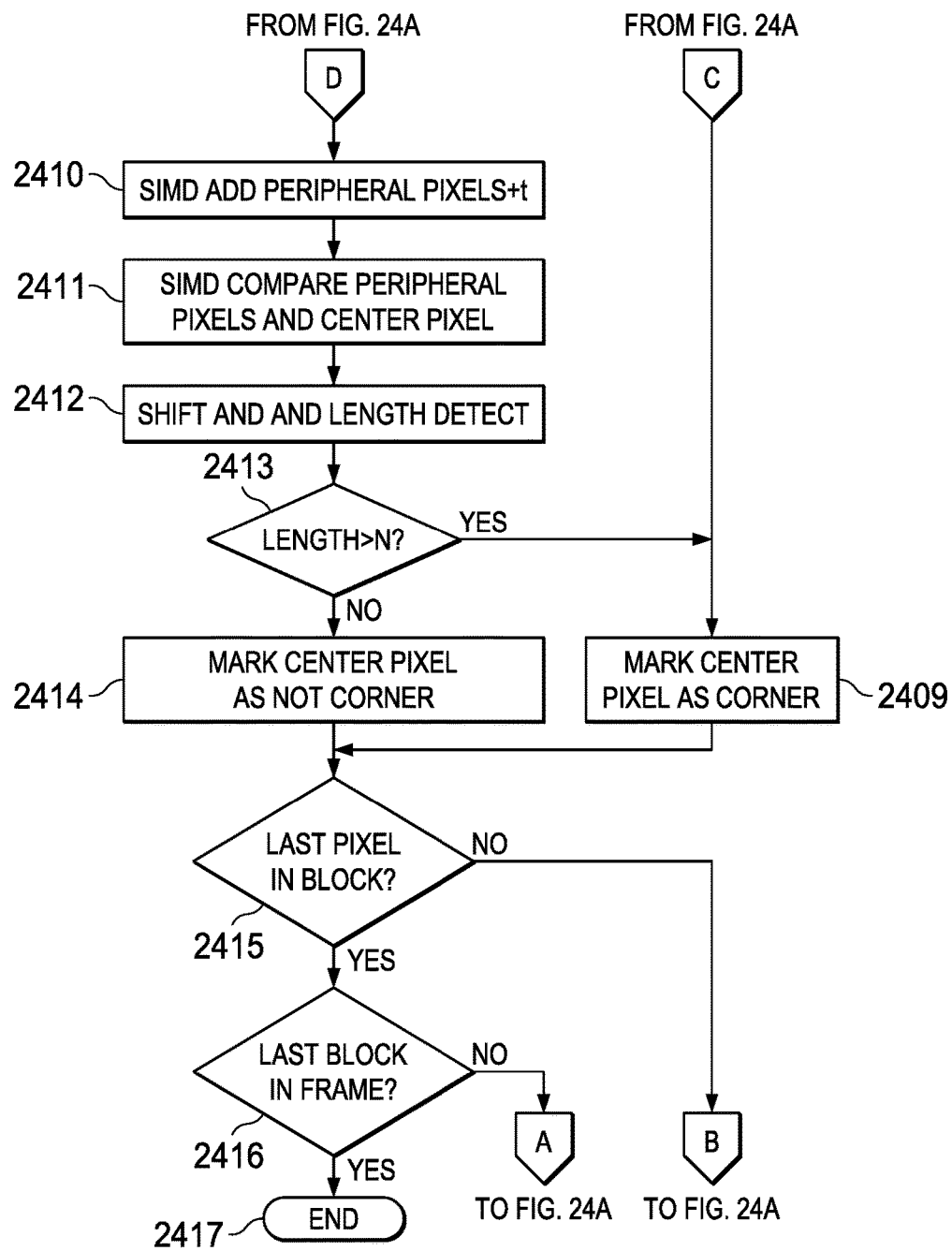

FIGS. 24A and 24B together are a flow chart of the major aspects of this invention for determining corner pixels in an image such as a video frame. It is assumed that the image data is stored in memory at the beginning of the process illustrated in FIGS. 24A and 24B. This process begins with start block 2401. The process loads the pixel data of the next 8×8 block into data registers in block 2402 as described above in conjunction with FIG. 18. At the beginning of the frame the next 8×8 pixel block is the first 8×8 pixel block. It is assumed that all the pixel data can be stored in a vector register file on the central processing unit. In the alternative the corner determination may be made with less than all the pixel data, such as only the luminance data. In this case, only the pixel data used in this corner turn detection needs to fit within a data register file.

The process next rearranges the 8×8 pixel block data into four 16 pixel sets of the 16 peripheral pixels corresponding to each center pixel of the 8×8 pixel block in block 2403. This is a determinative task as outlined by the description regarding FIGS. 18 and 19. The central processing unit, such as illustrated in FIG. 5, includes SIMD data rearrangement instructions to facilitate this task. FIG. 20 illustrates a VPERM instruction can enable this rearrangement.

The process next considers the next center pixel in block 2404. At the beginning of consideration of an 8×8 pixel block this next center pixel is the first center pixel. Block 2405 performs a SIMD subtract forming the difference of each of the 16 peripheral pixels of the center pixel and the threshold t. This is described above in conjunction with FIG. 20. Block 2406 performs a SIMD compare of respective differences and the center pixel value as described in conjunction with FIG. 20. As described the result of the comparison is a one bit value (True or False) for each of the 16 peripheral pixels that is the result of the comparison. This may be stored in a vector register file or in a scalar register file.

The process next performs the SHIFT and AND described in conjunction with FIG. 23 at block 2407. As noted above the exact amount of the shifts are selected with regard to the number of consecutive peripheral pixels N. The result of this process yields a value from the 16-bit comparison results that indicate whether there are N consecutive peripheral pixels having values more than the threshold t above the center pixel value. Also as noted above, in a preferred embodiment this SHIFT and AND process is applied to a 32-bit data word including duplicates of the vector compare. This permits determination of sets of consecutive pixels crossing the boundary between pixel 16 and pixel 1.

Block 2408 parses the SHIFT and AND results determining if there were at least N consecutive pixel greater than the center pixel plus the threshold. In this example the resulting data from the SHIFT and AND process is non-zero if there are at least N such consecutive pixels. If this is the case (Yes at test block 2408), then block 2409 marks the current center pixel as a corner pixel. If this is not the case (No at test block 2408), then blocks 2410, 2411, 2412 and 2413 repeat the test for the same 16 peripheral pixels and center pixel for the case of the peripheral pixel value is less than the center pixel value by more than the threshold. Block 2410 performs a SIMD addition forming the sum of each of the 16 peripheral pixels of the center pixel and the threshold t. Block 2411 performs a SIMD compare of respective differences and the center pixel value. This results in a one bit value (True or False) that is the result of the comparison for each of the 16 peripheral pixels. The process next performs the SHIFT and AND described in conjunction with FIG. 23 at block 2412. The result of this process yields a value from the 16-bit comparison results that indicate whether there are N consecutive peripheral pixels having values more than the threshold t below the center pixel value.

Block 2413 parses the SHIFT and AND results determining if there were at least N consecutive pixel less than the center pixel less the threshold. If this is the case (Yes at test block 2413), then block 2409 marks the current center pixel as a corner pixel. If this is not the case (No at test block 2413), then block 2415 marks the center pixel as not a corner pixel.

Whether the current center pixel is a corner pixel (block 2409) or not a corner pixel (block 2414), the process determines if the current center pixel was the last center pixel of an 8×8 pixel block at test block 2415. If this is not the last center pixel of an 8×8 pixel block (No at test block 2415), then flow advances to block 2404 to repeat for the next center pixel.

If this is the last center pixel of an 8×8 pixel block (Yes at test block 2415), then test block 2416 determines if the current 8×8 pixel block was the last block of the frame. If the current 8×8 pixel block was not the last block of the frame (No at test block 2416), then flow advances to block 2402 to load the next 8×8 pixel block. This next 8×8 pixel block may overlap the previous 8×8 pixel block in order to apply the FAST detection algorithm to all pixels. If the current 8×8 pixel block was the last block of the frame (Yes at test block 2416), then the process ends for this frame at end block 2417.

The advantages of this invention are: better data reuse in the load operations which reduces the number of memory accesses; easy data rearrangement via a single instruction against lot of cycles spent in rearranging data in the order desired; and a SHIFT and AND based technique that reduces the complexity of finding if there are N consecutive pixels.

What is claimed is:

1. A method of corner detection of pixels of an image comprising the steps of:
   loading an 8×8 pixel block data of the image from memory into central processing unit data registers;
   forming a 16 peripheral pixel data word for peripheral pixels corresponding to each of four center pixels in four 7×7 pixel blocks within the 8×8 pixel block;
   for each of the four 16 peripheral pixel data words
      determining for each of the 16 peripheral pixels whether a pixel value is greater than a corresponding center pixel value plus a predetermined threshold amount,
      determining whether there are N consecutive pixels of the 16 peripheral pixels having a pixel value greater than the corresponding center pixel value plus the threshold amount,
      marking the corresponding center pixel a corner pixel if there are N consecutive pixels of the 16 peripheral pixels having a pixel value greater than the corresponding center pixel value plus the threshold amount, where N is a predetermined constant, determining for each of the 16 peripheral pixels whether a pixel value is less than a corresponding pixel value minus the predetermined threshold amount, determining whether there are N consecutive pixels of the 16 peripheral pixels having a pixel value less than the corresponding pixel value plus the threshold amount, marking the corresponding center pixel a corner pixel if there are N consecutive pixels of the 16 peripheral pixels having a pixel value less than a corresponding pixel value minus the threshold amount, and marking the corresponding center pixel not a corner pixel if there are neither N consecutive pixels of the 16 peripheral pixels having a pixel value greater than the corresponding center pixel value plus the threshold amount nor N consecutive pixels of the 16 peripheral pixels having a pixel value less than a corresponding pixel value minus the threshold amount.

2. The method of claim 1, wherein:

said step of determining for each of the 16 peripheral pixels whether a pixel value is greater than a corresponding center pixel value plus a predetermined threshold amount comprises the steps of:

performing a SIMD subtraction of the 16 peripheral pixel data word and a constant having the threshold amount in each SIMD slot, performing a SIMD comparison of each difference of the SIMD subtraction and a first variable consisting of the corresponding center pixel value in each SIMD slot producing 16 one-bit comparison results.

3. The method of claim 2, wherein:

said step of determining whether there are N consecutive pixels of the 16 peripheral pixels having a pixel value greater than the corresponding center pixel value plus the threshold amount comprises the steps of:

performing a plurality of SHIFT and AND operations on the 16 one-bit comparison results, and determining whether a result of the Shift and AND operation is zero.

4. The method of claim 3, wherein:

N is nine; and said step of performing a plurality of SHIFT and AND operations performs a first right shift by one bit and ANDing with the 16 one-bit comparison results forming a first intermediate result, a second right shift by two bits and ANDing with the first intermediate result forming a second intermediate result, a third right shift by one bit and ANDing the second intermediate result forming a third intermediate result and a fourth right shift by one bit and ANDing the third intermediate result forming the shift and AND result.

5. The method of claim 3, wherein:

N is twelve; and said step of performing a plurality of SHIFT and AND operations performs a first right shift by one bit and ANDing with the 16 one-bit comparison results forming a first intermediate result, a second right shift by two bits and ANDing with the first intermediate result forming a second intermediate result, a third right shift by one bit and ANDing the second intermediate result forming a third intermediate result and a fourth right shift by four bits and ANDing the third intermediate result forming the shift and AND result.

6. The method of claim 1, wherein:

said step of determining for each of the 16 peripheral pixels whether a pixel value is less than a corresponding center pixel value minus a predetermined threshold amount comprises the steps of:

performing a SIMD addition of the 16 peripheral pixel data word and a constant having the threshold amount in each SIMD slot, performing a SIMD comparison of each difference of the SIMD addition and first variable consisting of the corresponding center pixel value in each SIMD slot producing 16 one-bit comparison results.

7. The method of claim 6, wherein:

said step of determining whether there are N consecutive pixels of the 16 peripheral pixels having a pixel value less than the corresponding center pixel value minus the threshold amount comprises the steps of:

performing a plurality of SHIFT and AND operations on the 16 one-bit comparison results, and determining whether a result of the SHIFT and AND operation is zero.

8. The method of claim 7, wherein:

N is nine; and said step of performing a plurality of SHIFT and AND operations performs a first right shift by one bit and ANDing with the 16 one-bit comparison results forming a first intermediate result, a second right shift by two bits and ANDing with the first intermediate result forming a second intermediate result, a third right shift by one bit and ANDing the second intermediate result forming a third intermediate result and a fourth right shift by one bit and ANDing the third intermediate result forming the shift and AND result.

9. The method of claim 7, wherein:

N is twelve; and said step of performing a plurality of SHIFT and AND operations performs a first right shift by one bit and ANDing with the 16 one-bit comparison results forming a first intermediate result, a second right shift by two bits and ANDing with the first intermediate result forming a second intermediate result, a third right shift by one bit and ANDing the second intermediate result forming a third intermediate result and a fourth right shift by four bits and ANDing the third intermediate result forming the shift and AND result.

10. The method of claim 1, wherein:

said step of forming a 16 peripheral pixel data word for peripheral pixels corresponding to each of said four center pixels in four 7×7 pixel blocks within the 8×8 pixel block includes for each of said four center pixels pre-calculating a control word specifying for each equal sized data portion of said corresponding 16 peripheral pixel data word a data location within said 8×8 pixel block data of the image in the data registers, and executing a vector permutation instruction having a first instruction specified operand of said 16 peripheral pixel data word stored in the data registers, a second instruction specified operation of a corresponding pre-calculated control word and a destination forming said 16 peripheral pixel data word for peripheral pixels for said corresponding center pixel, wherein said vector permutation instruction stores data in each equal sized data portion of said 16 peripheral pixel data word for peripheral pixels for said corresponding center pixel data from a data location within said first instruction specified operand specified by a corresponding equal sized data portion in said second instruction specified source operand.

11. The method of claim 10, further comprising the step of:

forming for each of said four center pixels said first variable consisting of the corresponding center pixel value in each SIMD slot by pre-calculating a center pixel control word specifying for each equal sized data portion a data location within said 8×8 pixel block data of the image in the data registers of said center pixel, and executing a vector permutation instruction having a first instruction specified operand of said 16 peripheral pixel data word stored in the data registers, a second instruction specified operation of a corresponding pre-calculated center pixel control word and a destination forming said first variable.

\* \* \* \* \*